(12) United States Patent
Hiroi et al.

(10) Patent No.: US 7,303,719 B2
(45) Date of Patent: Dec. 4, 2007

(54) RESIN MOLDED ARTICLES

(75) Inventors: Kiyofumi Hiroi, Kobe (JP); Hideo Fujiwara, Kobe (JP); Hidehisa Matsuo, Kobe (JP); Yasuhiro Yao, Kobe (JP)

(73) Assignee: Tigers Polymer Corporation, Osaka (JP)

( * ) Notice: Subject to any disclaimer, the term of this patent is extended or adjusted under 35 U.S.C. 154(b) by 290 days.

(21) Appl. No.: 10/758,116

(22) Filed: Jan. 16, 2004

(65) Prior Publication Data

US 2004/0150138 A1 Aug. 5, 2004

Related U.S. Application Data

(62) Division of application No. 09/984,062, filed on Oct. 26, 2001, now abandoned.

(30) Foreign Application Priority Data

| | | | |
|---|---|---|---|
| Nov. 2, 2000 | (JP) | ............................ | 2000/336325 |
| Aug. 3, 2001 | (JP) | .................................... | 236360 |
| Aug. 22, 2001 | (JP) | ............................ | 2001/251169 |

(51) Int. Cl.
*B29C 45/56* (2006.01)
*B29C 45/57* (2006.01)

(52) U.S. Cl. .................................... 264/328.7; 264/319

(58) Field of Classification Search ............. 264/328.7, 264/319
See application file for complete search history.

(56) References Cited

U.S. PATENT DOCUMENTS

| | | | |
|---|---|---|---|
| 1,737,455 A | 11/1929 | Frederick | |
| 1,824,825 A | 9/1931 | Mains | |
| 2,000,769 A | 5/1935 | Mansur | |
| 3,846,522 A * | 11/1974 | Goldman | ................... 264/489 |

FOREIGN PATENT DOCUMENTS

| | | |
|---|---|---|
| JP | 07-205231 | 8/1995 |
| JP | 07-329103 | 12/1995 |
| JP | 2001-108066 | 4/2001 |

OTHER PUBLICATIONS

JP Office Action of Application 2001-236360 dated May 18, 2006.

* cited by examiner

*Primary Examiner*—Monica A Huson
(74) *Attorney, Agent, or Firm*—Pillsbury Winthrop Shaw Pittman LLP (57) ABSTRACT

A disk-shape resin molded article such as a gear comprises a rim, a boss, a web having a disk configuration for connecting the rim and the boss, and gear teeth formed on the rim. The molded article is produced by an injection-compression molding process which comprises injecting a molten resin into a cavity of a metal mold, and pressing a web site and at least one site selected from the group consisting of a boss site and a rim site in a thickness direction. The cavity may have a capacity larger than the solidified products by contraction amount of the injected molten resin.

7 Claims, 12 Drawing Sheets

FIG. 12

RESIN MOLDED ARTICLES

This is a divisional of Ser. No. 09/984,062 filed Oct. 26, 2001 now abandoned, and further claims priority to Japanese application No. 336325/2000, filed Nov. 2, 2000; Japanese application No. 236360, filed Aug. 3, 2001; and Japanese application No. 251169/2001, filed Aug. 22, 2001, entire the contents of all of which are incorporated herein in their entirety by reference.

FIELD OF THE INVENTION

This invention relates to a synthetic resin molded article having a disk configuration, and particularly, to a disk-shape resin molded article having a high mechanical strength and dimensional precision.

BACKGROUND OF THE INVENTION

A metal molded article has been widely replaced with a disk-shape resin molded article including injection molding articles such as a synthetic resin gear, a pulley or the like. These articles are conventionally molded with an engineering plastic by an injection molding technology. The disk-shape resin molded article usually comprises a rim forming a peripheral area, a boss forming a concentric inner site, and a web having a disk configuration for connecting the rim and the boss, and is molded unitarily as a monobloc article by the injection molding. These molded articles are intensely required to have severe precise roundness or circularity of the peripheral or inner surface.

However, for example, in the case of a synthetic resin gear (or toothed wheel) having gear teeth at the outer region of the rim, the strain of the molded gear is increased with widening the gear teeth due to cooling-contraction or shrinkage of the synthetic resin. Thus, the injection molding for forming the gear deteriorates dimensional precision or accuracy of the gear teeth. In order to overcome these disadvantages, it is intended to reduce or thin the thickness of both sides of the web for suppressing the contraction of the teeth in the cooling-solidification process. This intention unfortunately causes the reduction in rigidity of the molded article, and therefore these articles are unsuitable for applications required to have a high mechanical strength.

Thus, it is desired that the rigidity of the articles is retained by thickening the web as well as reducing the contraction ratio of thicken resin articles to inhibit the deformation of the products. For realization of these characteristics, an injection-compression molding method is proposed for inhibiting the contraction or shrinkage of the web and the formation of shrinkage cavities. This method comprises a step for injecting a molten resin into a cavity for forming a thicken web, and a step for pressing the thicken web in a thickness direction by advancing a movable mold member from one side to the other side of the web in an injection metal mold.

Figure 10:
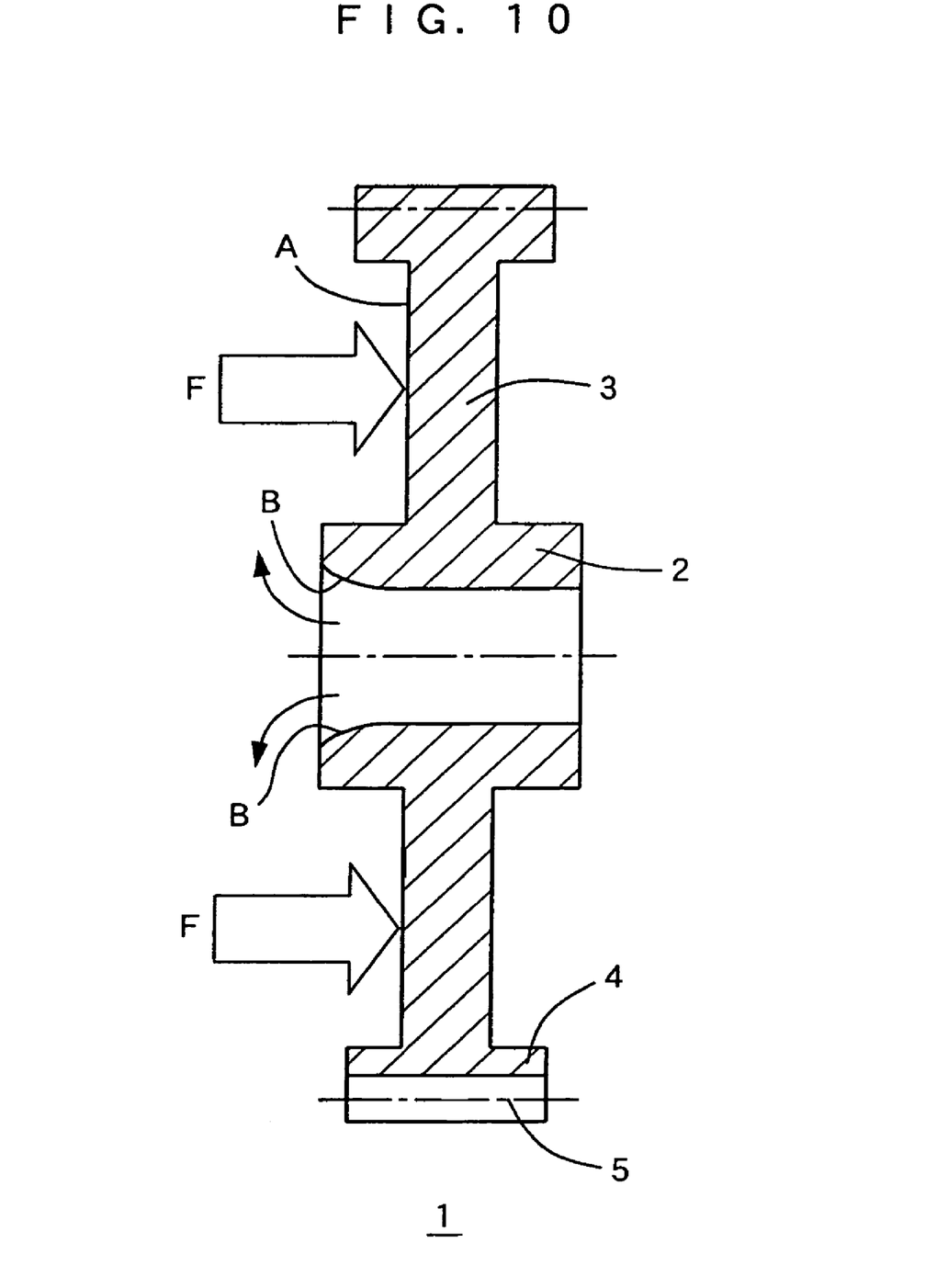
FIG. 10 is a schematic sectional view of a conventional disk-shape plastic molded article.
Figure 11:
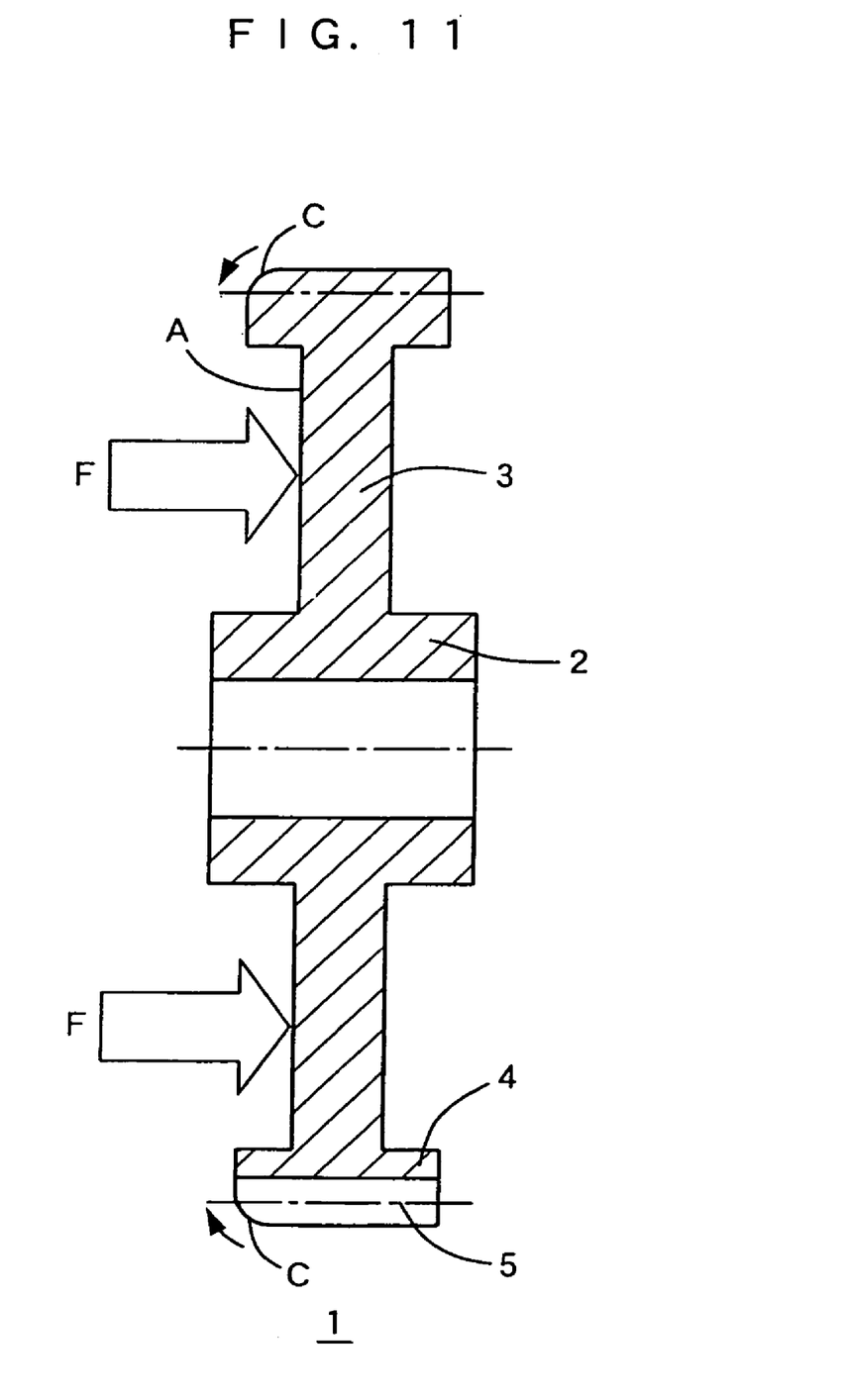
FIG. 11 is a schematic sectional view of the conventional disk-shape plastic molded article.
Figure 12:
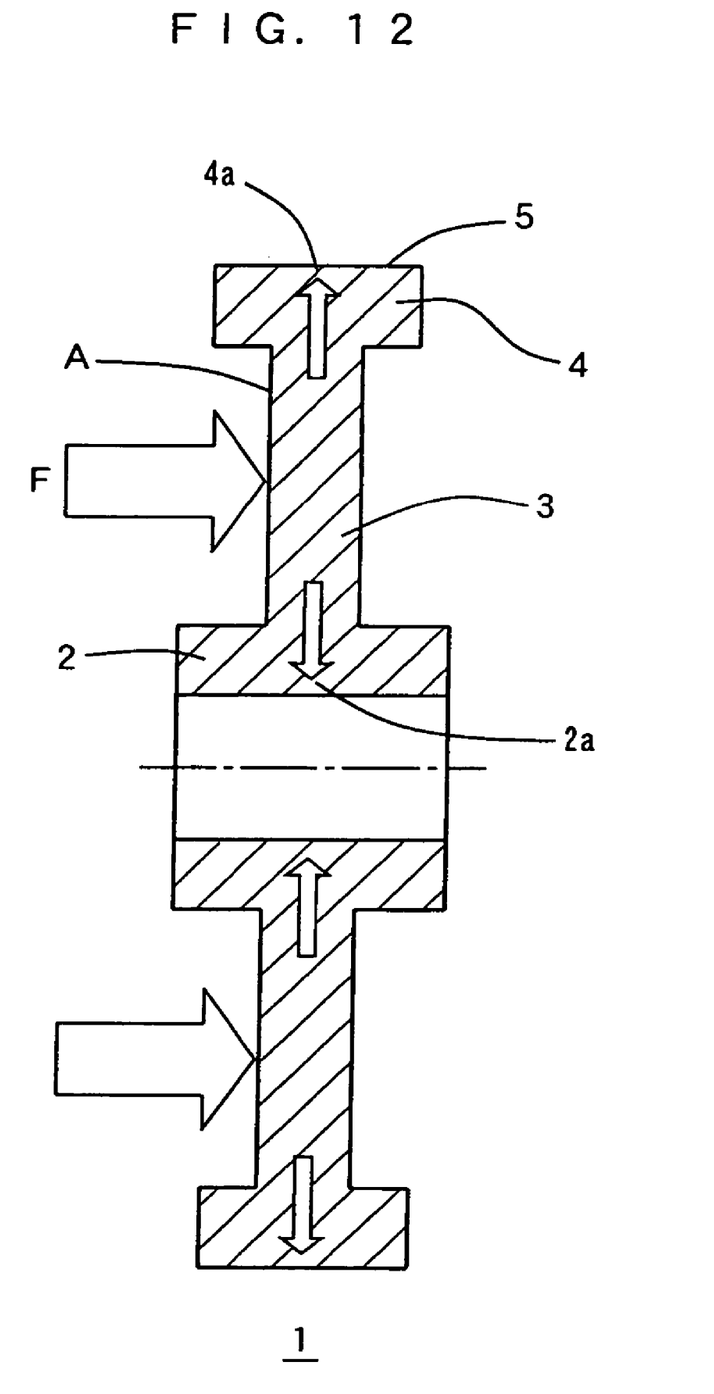
FIG. 12 is a schematic sectional view of the conventional disk-shape plastic molded article.

As shown in FIG. 10, a resin-molded gear 1 comprises a cylindrical boss 2, a web 3 extending outwardly from the boss and having an uniform thickness, a circular rim 4 formed outwardly on the web, and a gear tooth 5 formed on the rim 4. When a compression force F acts on the one side face A of the web 3 in the injection-compression molding process, the edge of the boss 2 is pulled or attracted outwardly as shown in an arrow direction to deform outwardly the inner surface B of the boss. Therefore, the inner configuration or dimension of the boss 2 may be warped. Further, as shown in FIG. 11, the compression force F on the one side face A of the web 3 causes a force pulling or attracting the edge of the rim 4 inwardly as shown in an arrow direction to deform inwardly the outer circumferential surface C of the rim. Thus, the outer configuration or dimension may also be warped. In more detail, as shown in FIG. 12, the compressing force F on the surface A acts the boss 2 and/or the rim 4 via the uniform thickness web 3, and the unbalanced local strain affects concentrically on the axially middle site 2a of the boss 2 or the axially middle site 4a of the rim 4 (see arrow direction) to cause deterioration of the dimensional accuracy. That is, the axially center site 2a of the boss is deformed inwardly, the axially center site 4a of the rim is outwardly deformed, and these deformations deteriorate the configuration or dimensional accuracy of the boss 2 and the rim 4 as well as the gear tooth 5. To solve these disadvantages, the shape or dimension of the boss and rim is designed with considering the deformation amount. However, these modifications complicate the processing or working of the metal mold including a shape of an undercut and require forcible release of molded articles from the metal mold to deteriorate the dimensional precision of the molded articles.

SUMMARY OF THE INVENTION

It is, therefore, an object of the present invention to provide an injection-molded article having a high mechanical strength and dimensional precision and to provide a process for producing the same.

It is another object of the invention to provide a disk-shape resin molded article having no deformation of an inner surface of a boss and/or an outer surface of a rim (or a gear tooth) and to provide a process for producing the same.

A further object of the invention is to provide a method of producing a resin molded gear having a high mechanical strength and a dimensionally high precision with inhibiting deformation of a boss and/or a rim (or a gear tooth) by an injection molding technology.

The present inventors did much investigation to accomplish the above objects, and as a result, found that compression of not only the web but also the boss and/or rim in the injection molding process improves remarkably the mechanical strength and the dimensional precision of the molded articles. The present invention has been accomplished based on the above findings.

Thus, A disk-shape resin molded article of the present invention comprises a rim forming a peripheral area, a boss forming a concentric inner area, and a web having a disk configuration for connecting the rim and the boss. The resin-molded article may comprise a rim forming a peripheral circumference area, a boss forming a concentric inner area, a web having a disk configuration for connecting the rim and the boss, and outer teeth formed on the rim. The molded article of the invention can be formed by an injection molding process which comprises injecting a molten resin into a metal mold, and pressing a web site and at least one site selected from the group consisting of a boss site and a rim site in a thickness direction.

The molded article is practically molded unitarily as a monobloc article by an injection molding process which comprises injecting a molten resin into a metal mold, and pressing a web site and at least one site selected from the group consisting of a boss site and a rim site in a thickness direction. In the pressing step, at least one site selected from the group consisting of the both and the rim may be pressed at least partially. Further, the web site and at least one site selected from the group consisting of the boss site and the rim site may usually be pressed with surface contact. The molded article includes various products such as a resin-molded gear, and can be formed with various resins including an engineering plastic.

In accordance with the present invention, since at least part of the boss and/or rim as well as the web is pressed concurrently or simultaneously in the thickness direction in the injection-compression molding process, the boss and/or rim can be effectively prevented from the deformation to realize a high precise dimension of the molded articles.

The present invention also discloses a disk-shape resin molded article comprising a rim forming a peripheral area, a boss forming a concentric inner area, and a web having a disk configuration for connecting the rim and the boss. In the resin molded article, the web comprises a middle circular site and a inclined area extending inwardly or outwardly from the middle circular site toward to the rim and/or the boss with increasing the thickness. The resin-molded article of the invention can be formed by an injection molding process which comprises injecting a molten resin into a metal mold, and pressing a web site in a thickness direction. The middle circular site may have a uniform thickness, and the inclined area may be formed circumferentially with extending inwardly and outwardly from the middle circular site toward to the rim and the boss with increasing the thickness. The thickness of the inclined area may gradually increase toward to the rim and/or the boss.

In the above molded articles, the compressing force generated with injecting and compressing the web disperses or spreads widely along to the inclined lateral surface of the inclined peripheral area of the web, and the dispersed uniform force acts on not only an axially middle site of the boss and/or an axially middle site of the rim but also the circumferences or surroundings of the boss and/or the rim. As a result of the compression, the partial deformation of the boss and/or rim (or gear teeth) can be effectively suppressed to obtain a high dimensional accuracy of the molded articles.

The present invention further discloses an injection molding process for producing a disk-shape resin molded article comprising a rim forming a peripheral area, a boss forming a concentric inner area, and a web having a disk configuration for connecting the rim and the boss. The process comprises injecting a molten resin into a cavity of a metal mold, and pressing, in the molding process, a web site and at least one site selected from the group consisting of a boss site and a rim site in a thickness direction.

In the pressing step, it is only required to press at least part of the lateral side of the boss and/or the rim, and the whole lateral side of the boss and/or the rim is not essentially pressed. The injection-compression molding of the web, boss and rim by the present invention includes a micro-molding process. In this process, a cavity is designed to have a capacity, including contraction amount of the injected resin, larger than a volume of the final solidified products. Thus, the process comprises injecting a molten resin into the cavity, and advancing a movable mold member in a suitable timing with the injection by a hydraulic cylinder to press the predetermined lateral side of the boss and/or the rim as well as the web.

Thus, the metal mold comprises a fixed mold member, a movable mold member disposed movably relative to the fixed mold member, a pressing core movably disposed or faced to at least one lateral side of the web, and a center pin disposed movably to insert into the bore of the boss and to contact with the lateral surface of the boss. The metal mold members, the pressing core and the center pin move forwardly to form the closed cavity, and the cavity has a capacity larger than a volume of the final molded article by a contraction volume of the injected resin. In the molding process, the pressing core is advanced to an original position separated from the fixed mold member with a distance corresponding to the volume of the injected molten resin, and the molten resin is injected into said cavity in response to the completion of the advance movement of the pressing core to the original position. Further, in the pressing step, the pressing core is further advanced to a predetermined position which corresponds to the contraction volume or shrinking amount of the injected molten resin in response to the injection of the molten resin.

DETAILED DESCRIPTION OF THE INVENTION

Figure 2:
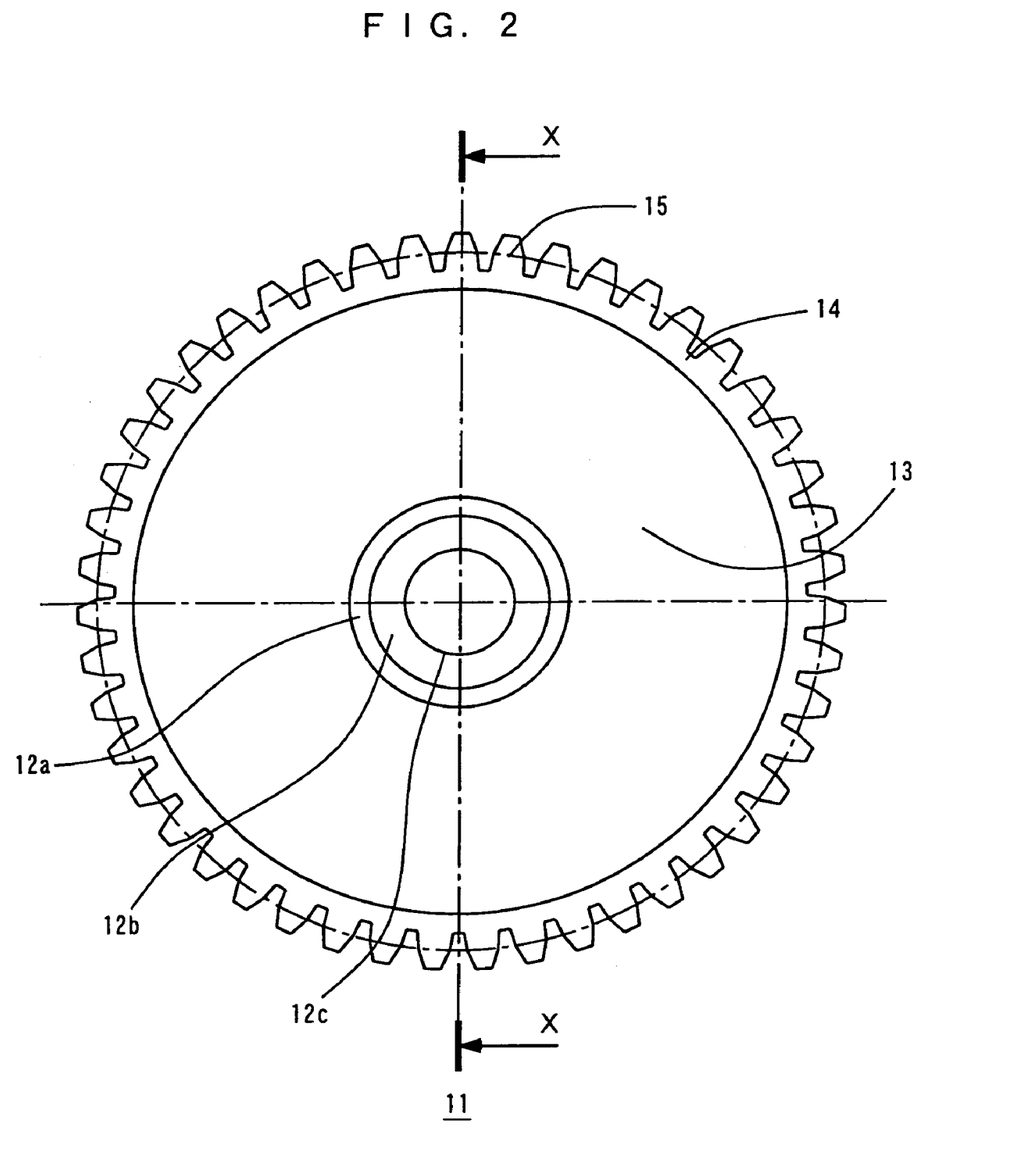
FIG. 2 shows a schematic plane view of an outer tooth gear as the disk-shape plastic molded article.
Figure 3:
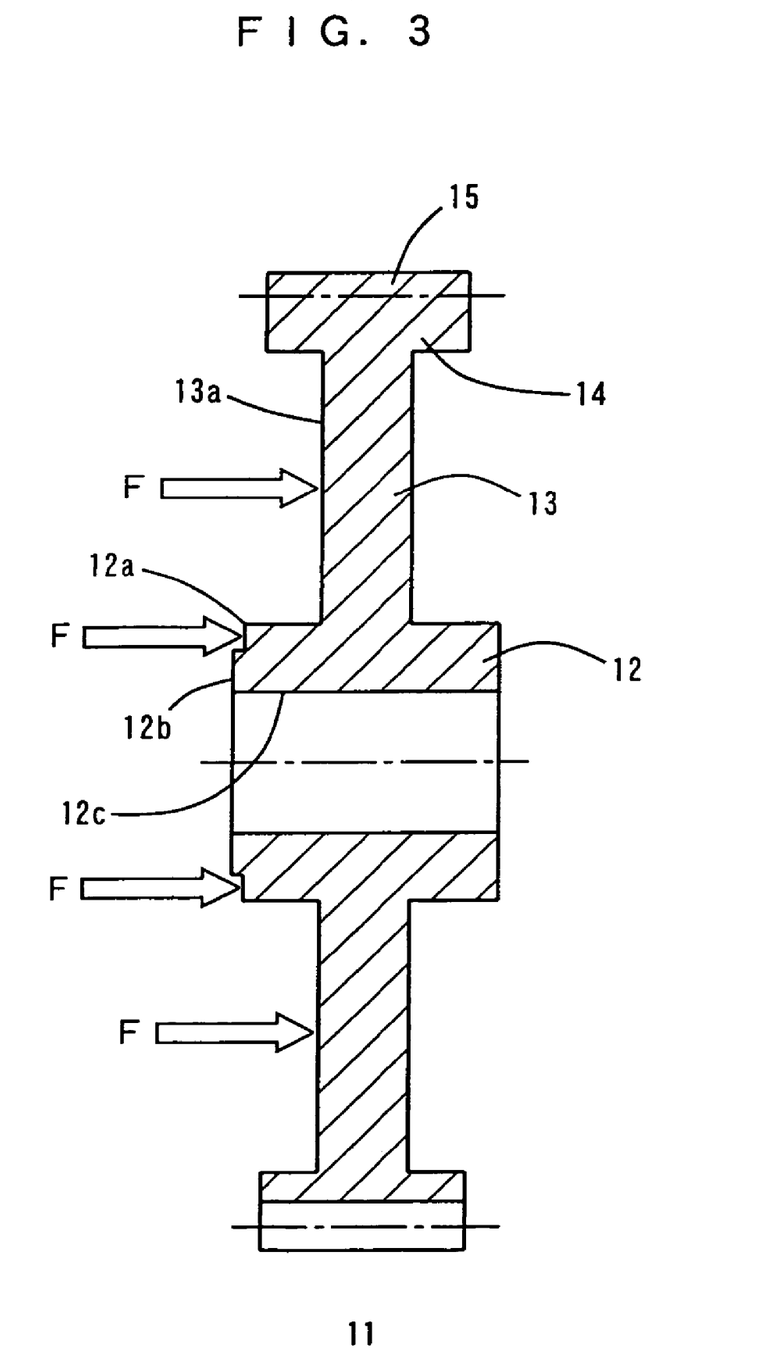
FIG. 3 shows a sectional view taken along lines X-X of FIG. 2.

As examples of a synthetic resin molded article of the present invention, there may be include a gear having an outer gear tooth, a disk-shape molded article or the like, and FIGS. 2 and 3 show, as a preferred embodiment, an outer tooth gear produced by an injection-compression molding technology. The synthetic resin molded gear 11 comprises a cylindrical boss 12 for fitting unitarily or firmly a rotatable shaft (not shown) into a bore thereof, a thicken web 13 extending from the boss 12 in a radial direction (or outwardly), and a circular rim 14 extending form the web 13 in a radial direction (or outwardly), and plural gear teeth 15 are formed on the peripheral of the rim 14 at a predetermined pitch.

Figure 1:
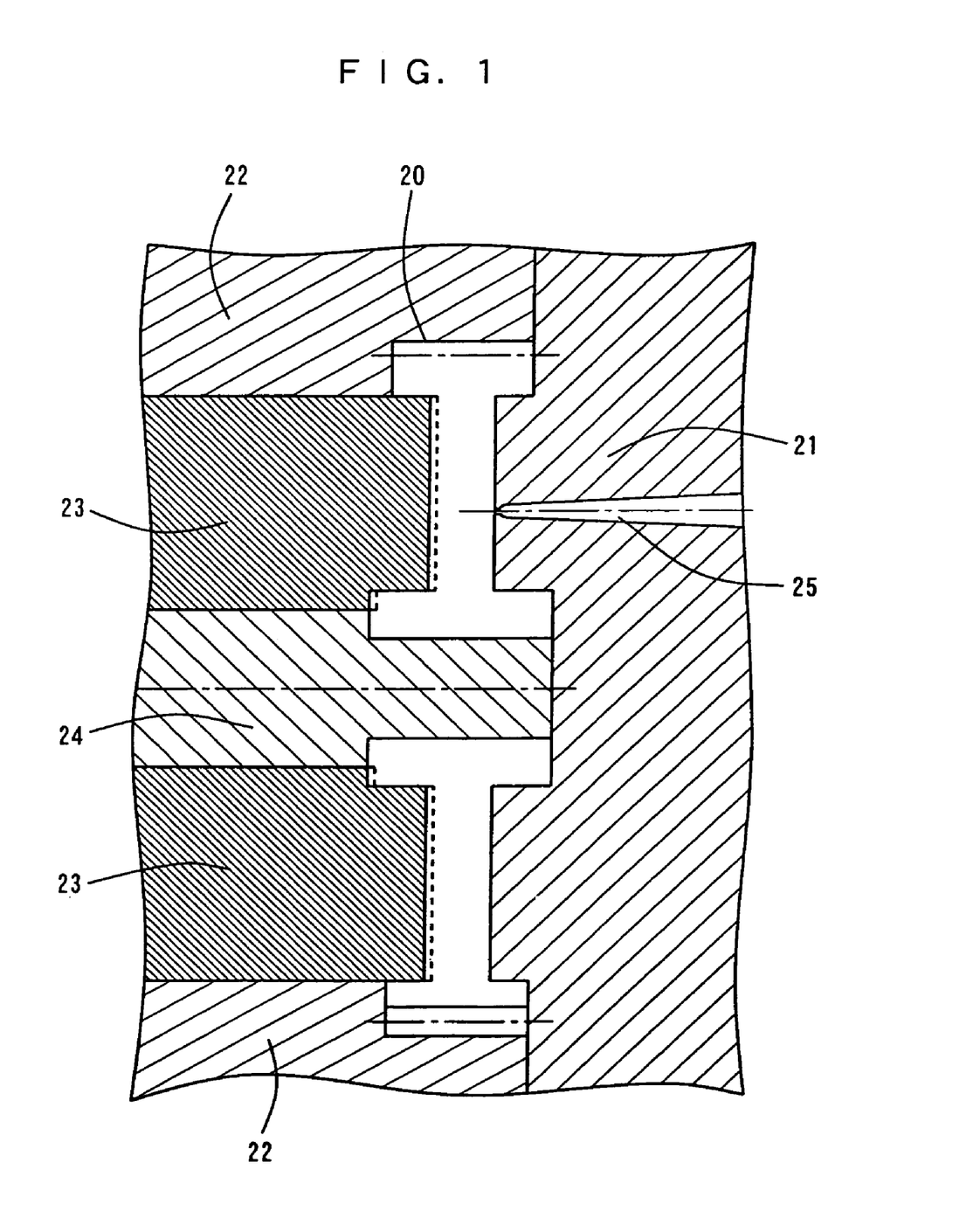
FIG. 1 shows a schematic sectional view of an injection metal mold for a disk-shape plastic molded article.

FIG. 1 shows a sectional view of an injection metal mold for forming the resin-molded gear 11. The metal mold comprises a fixed mold member 21 and a movable mold member 22 which is movable relative to the fixed mold member, and these mold members form a closed cavity 20 with forward displacement of the movable mold member in a thickness direction. A pressing core 23 and a center pin 24 are disposed in an inner side of the movable mold member 22. That is, the pressing core 23 is movably disposed at a position corresponding to one lateral side 13a of the web of the gear 11 and an outer edge side (lateral outside) 12a of the boss, and the center pin 24 is also movably disposed at a position corresponding to an inner circular surface (inner wall, or bore) 12c and an inner edge side (lateral inside) 12b of the boss (see FIGS. 2 and 3). Thus, the pressing core 23 can be faced to the lateral side of the web 13 and the outer edge (lateral outer region) 12a of the boss 12, and the center pin 24 can be inserted into the bore of the boss 12 and is faced to the inner edge (lateral inner region) 12b of the boss 12.

In the molding process of the resin molded gear using the injection metal mold, the advancement of the movable mold member 22, the pressing core 23 and the center pin 24 near to the fixed mold member 21 forms the closed cavity 20 which has a capacity larger than a volume of the molded gear by a contraction volume (or shrinking amount) of the injected molten resin. Thus, the pressing core 23 is in an original position separated from the fixed mold member 21 with a distance corresponding to the volume of the injected molten resin.

In response to the advance movement of the pressing core 23 to the original position, the molten resin is injected from a gate 25 of the fixed mold member 21 into the cavity 20, and the injected or filled molten resin is immediately cooled and solidified on contact with the metal mold members. Thus, in response to the injection of the molten resin, the pressing core 23 is further advanced by a hydraulic cylinder or actuator (not shown) to reach a predetermined position shown by a dotted line which corresponds to the contraction volume (or shrinking amount) of the injected molten resin. That is, the compression amount of the injected resin corresponding to the contraction or shrinking ratio offsets the deformation of the molded articles.

The pressing core 23 compresses the injected resin in the cavity 20 in an axial direction (i.e. a thickness direction) at the compressed sites, i.e. the lateral side 13a of the web 13 and the outer part 12a of the boss 12, in the molding process.

Therefore, the resultant resin molded gear possesses a high dimensional precision without deformation of the inner circumferential surface (inner wall) of the boss. Thus, it can be realized to thicken the web with suppressing the deformation of the molded articles.

In the above embodiment, although the boss is pressed partially at the lateral outside 12a, the pressing site or area of the lateral side of the boss may be selected or extended/narrowed in accordance with the shape of the molded articles or a deformation degree of the inner wall (or the inner circumferential surface) of the boss. For example, the entire or whole lateral side including the inner edge side (lateral inside) 12b of the boss may be compressed.

Figure 5:
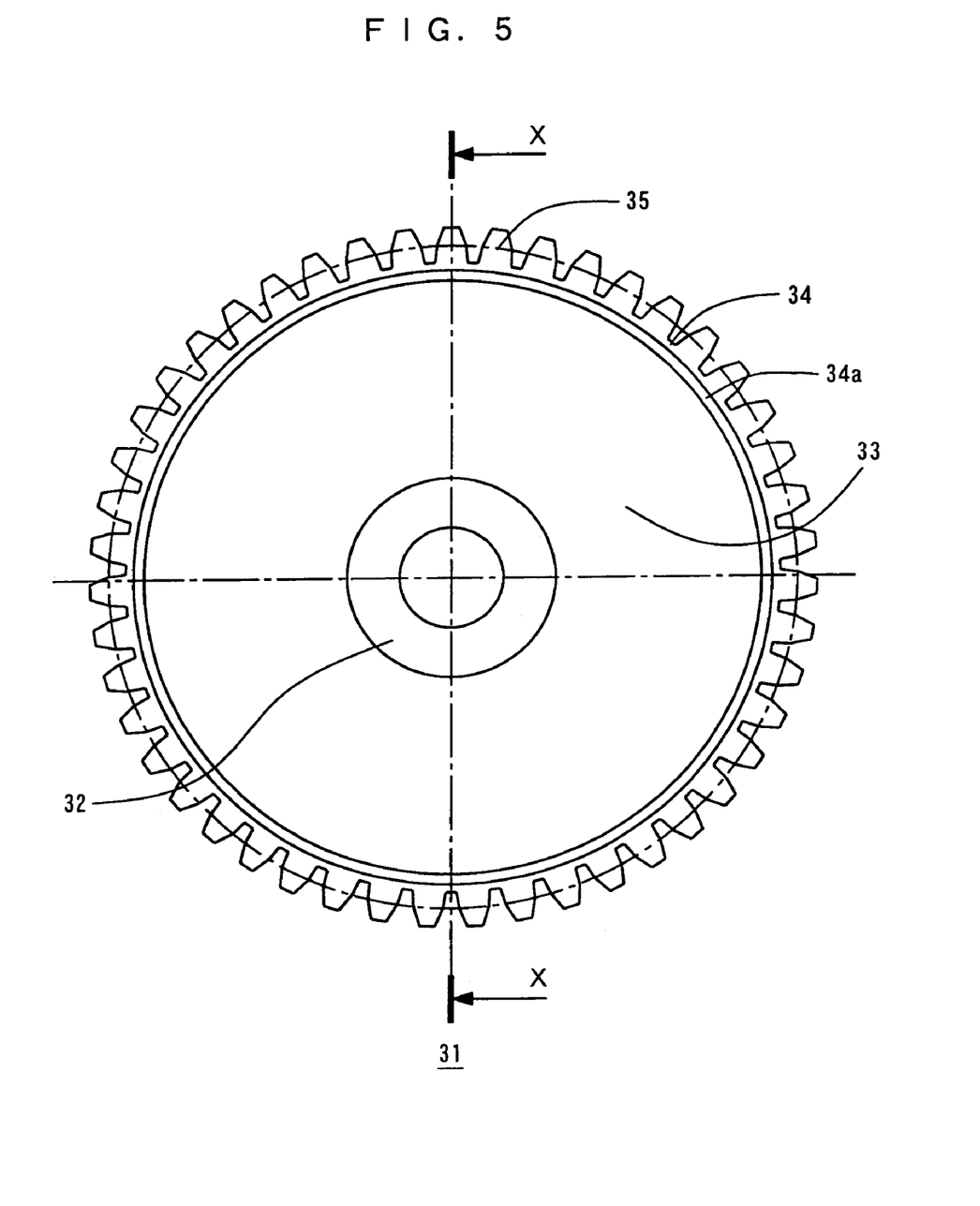
FIG. 5 shows a schematic plane view of another gear having outer gear tooth as the disk-shape plastic molded article.
Figure 6:
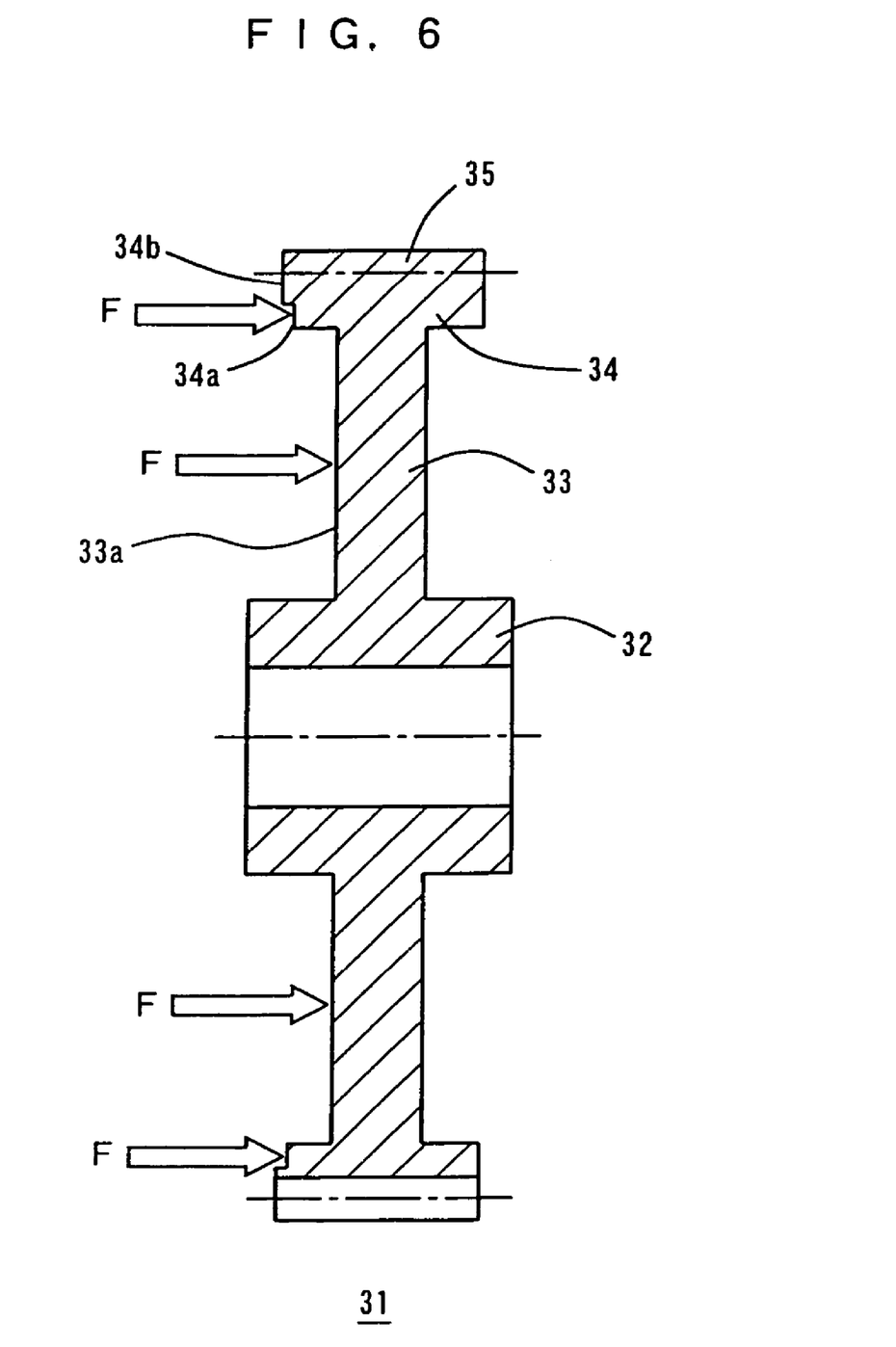
FIG. 6 shows a sectional view taken along lines X-X of FIG. 5.

FIGS. 5 and 6 shows another embodiment of a gear having outer gear teeth, which is produced by an injection-compression molding technology. The synthetic resin molded gear 31 comprises, as same as in the above embodiment, a cylindrical boss 32 to be fitted unitarily or firmly a rotatable shaft (not shown) into a bore thereof, a thicken web 33 extending from the boss 32 in a radial direction (or outwardly), and a circular or ring rim 34 extending form the web 33 in a radial direction (or outwardly), and plural gear teeth 35 are formed on the peripheral of the rim 34 at a predetermined pitch.

Figure 4:
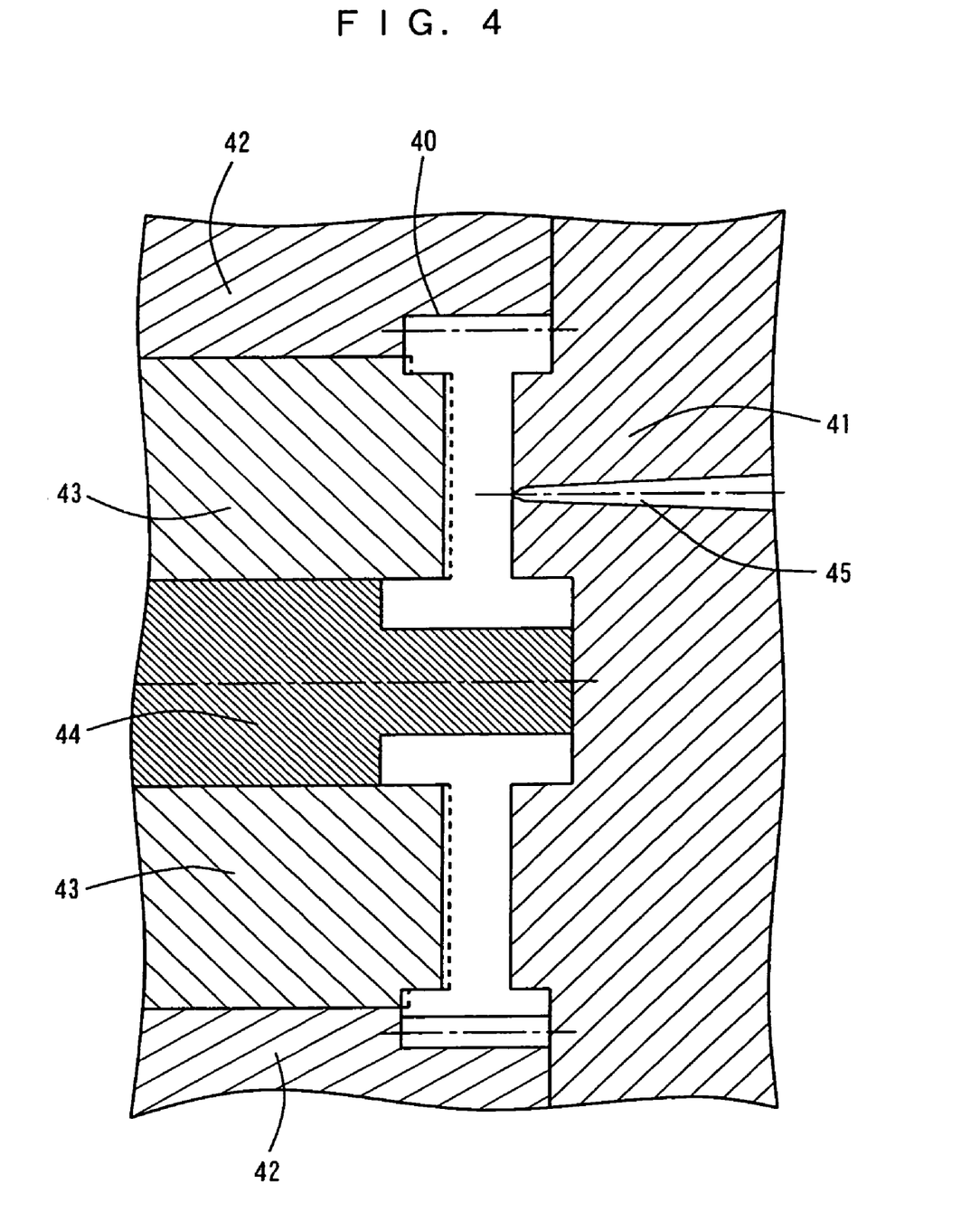
FIG. 4 shows a schematic sectional view of another injection metal mold for a disk-shape plastic molded article.

FIG. 4 shows a sectional view of another injection molding metal mold for forming the resin-molded gear 31. The metal mold has the substantially same construction or members as in FIG. 1 except that a movable pressing core 43 is disposed for contact with a lateral side 33a of the web of the gear 31 and an inner edge side (lateral inner side) 34a of the rim, and a center pin 44 is movably disposed for insertion into an inner wall and for contact with a lateral side of the boss 32.

In the molding process using such injection metal mold, the movable mold member 42, the pressing core 43 and the center pin 44 are moved forwardly near to the fixed mold member 41 to form a closed cavity 40 which has a larger capacity than the volume of the molded gear by a contraction volume (or shrinking amount) of the injected molten resin. Thus, in an original position in the molding process, the pressing core 43 is apart from the fixed mold member 41 at a predetermined distance corresponding to the contraction volume (or shrinking amount) of the injected molten resin.

In such situation, the molten resin is injected from a gate 45 of the fixed mold member 41 into the cavity 40, and the injected molten resin begins to solidification. on contact with the surfaces of the metal mold members. Thus, in response to the injection of the molten resin, the pressing core 43 is moved forwardly by a hydraulic cylinder or actuator (not shown) to a predetermined position shown by a dotted line in FIG. 4 which corresponds to the contraction volume (or shrinking amount) of the injected molten resin.

The pressing core 43 compresses, in the injection-compression molding process, the injected resin in the cavity 40 in an axial direction (i.e. a thickness direction) at the pressing sites, i.e. the lateral side of the web 33 and the inner edge side (lateral inner side) 34a of the rim 44 to suppress effectively the deformation of the gear due to the shrinkage of the molded resin.

Therefore, the resultant molded outer tooth gear has a given dimensional accuracy without deformation or defects of the rim outer configuration. In the above embodiment, although the rim is pressed partially at the lateral side 34a, the pressing site or area of the lateral side of the rim may be selected or extended/narrowed in accordance with the shape of the molded articles or a deformation degree of the outer region of the rim. For example, the entire or whole lateral side including the outer edge side (lateral outer side) 34b of the rim may be pressed.

Figure 8:
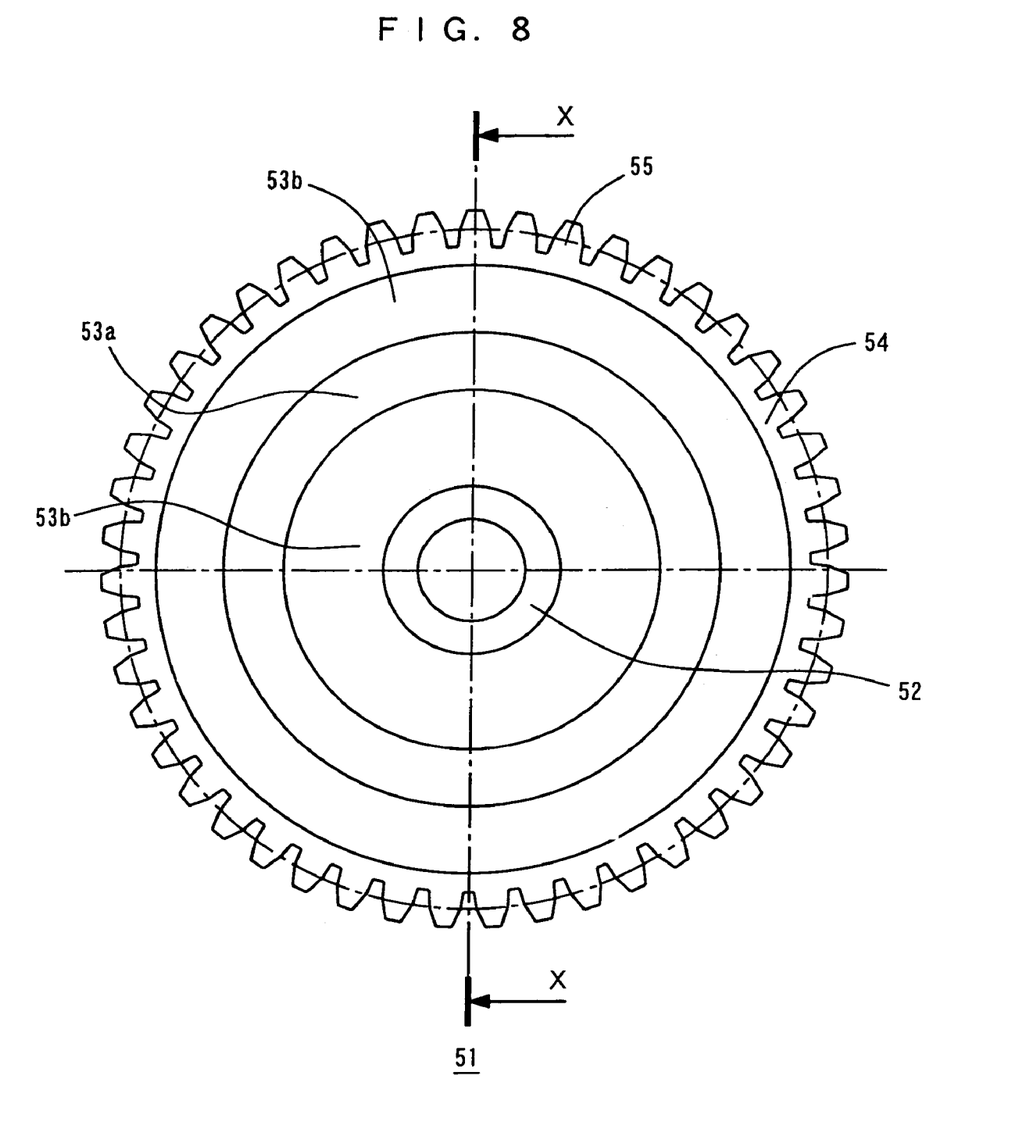
FIG. 8 shows a schematic plane view of an outer tooth gear as the disk-shape plastic molded article.
Figure 9:
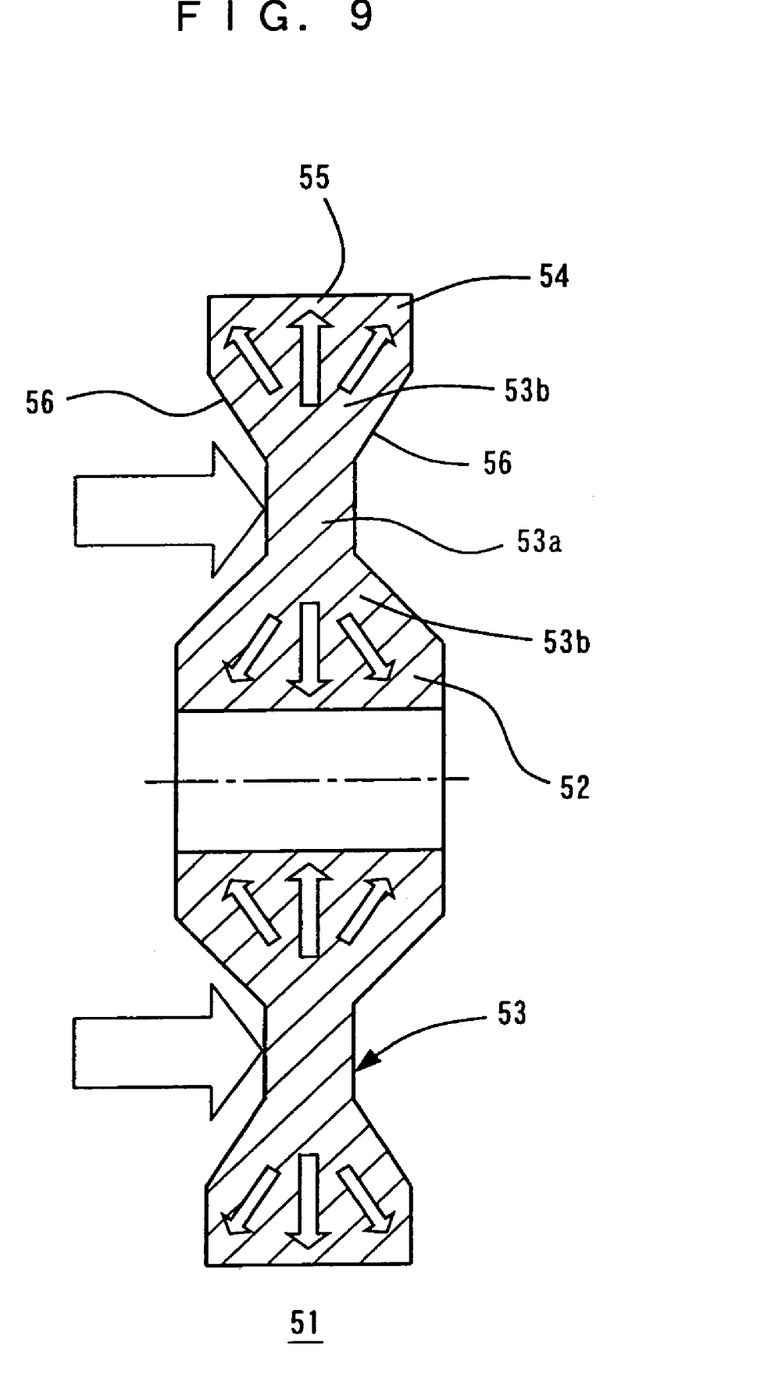
FIG. 9 shows a sectional view taken along lines X-X of FIG. 8.

FIGS. 8 and 9 each shows a structure of an outer tooth gear as a disk-shape resin molded article which is produced by an injection-compression molding. The synthetic resin molded gear 51 comprises, as similar to the above embodiments, a cylindrical boss 52, a web 53 and a circular rim 54, and a plurality of gear teeth 55 are formed on the outer peripheral of the rim 54 with a given pitch.

The web 53 comprises a middle circular site 53a positioning at the middle region of the web in a radius direction and having a minimum and uniform thickness, and inclined circumference areas (or marginal areas) 53b,53b extending inwardly and outwardly from the both edges of the middle circular site 53a respectively. The thickness of the inclined or sloped circumference areas 53b,53b gradually increase toward to the boss 52 and the rim 54 to form inclined surfaces 56 at the both outer and inner circumference areas of the web.

Figure 7:
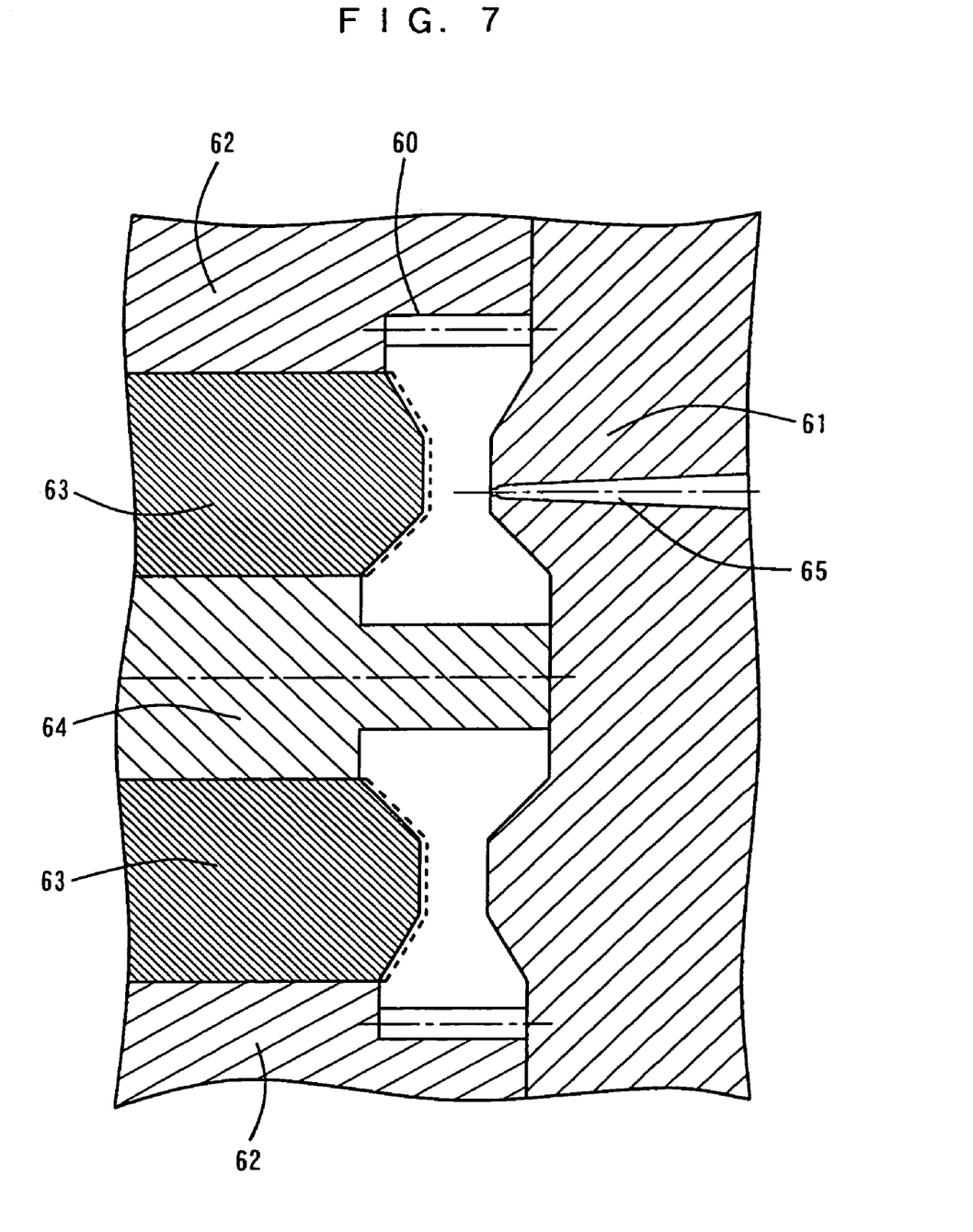
FIG. 7 shows a schematic sectional view of an injection metal mold for a disk-shape plastic molded article.

FIG. 7 shows a schematic sectional view of an injection metal mold for the synthetic resin molded gear 51. The metal mold comprises a fixed mold member 61 and a movable mold member 62 which are formable a closed cavity 60 by forward movement of the movable mold member in a thickness direction. To the inner space of the movable mold member 62 are movably disposed a pressing core 63 and a center pin 64. The pressing core 63 is disposed or faced to one lateral side of the web 53, i.e. the whole lateral side including one side surfaces of the middle circular site 53a and the inclined or sloped circumference areas 53b,53b. The center pin 64 is disposed movably relative to the boss 52 so as to insert into the inner wall or bore of the boss and to contact with the lateral surface of the boss.

The use of the injection metal mold for producing the resin-molded gear forms the closed space or cavity 60 by forward movement of the movable mold member 62, the pressing core 63 and the center pin 64 relative to the fixed mold member 21. As similar to the above embodiments, the capacity of the cavity 60 is designed to have a larger space or capacity than the volume of the final product (the molded gear) with considering a contraction or shrinking volume of the injected resin. Therefore, the pressing core 63 is reached to a predetermined position which is separated from the fixed mold member 61 and which corresponds to the the volume including the contraction volume (or shrinking amount) of the injected molten resin.

In response to the completion of reaching the pressing core 63 to the predetermined position, a molten resin is injected from a gate 65 of the fixed mold member 61 into the cavity 60, the injected or filled molten resin is rapidly cooled and solidified on the contact with the metal mold members. Therefore, in response to the injection of the molten resin, the pressing core 63 is further advanced by a hydraulic cylinder or actuator (not shown) to reach a predetermined position shown by a dotted line which corresponds to the contraction volume (or shrinking amount) of the injected molten resin.

In the injection-compression molding process, the resin in the cavity 60 can be molded with pressing the whole lateral side of the web 53 in the axial or thickness direction by the pressing core 63. Particularly, the compression force mainly acted on the middle circular site 53a is dispersed or spread widely through the broaden or widen surfaces of the inclined circumference areas 53b,53b, and thus the dispersed uniform force transmits and acts on the boss or the rim.

Accordingly, the process realizes a resin molded gear having a high dimensional precision without deformation or defects of the inner circumferential surface (inner wall or bore) of the boss and/or the outer circumferential surface (or gear teeth) of the rim. In the above embodiment, although the inclined circumference areas 53b,53b of the web are formed at both the lateral inner sides (boss side) and the lateral outer side (rim side), an inclined area may be formed at at least one side selected from the inner and the outer sides of the web. The inclined area may be formed at an appropriate region of the web in the radius direction with a suitable width, and is usually formed at the edge of the web in the curcumferential direction.

The gradient of the inclined circumference area (degree of thickness increase) can be selected suitably in accordance with size or applications of the articles and may be 1 to 60°, preferably 5 to 45° and more preferably 10 to 30°.

In the above embodiment, if necessary, the boss site and/or the rim site may be pressed in a thickness direction.

The disk-shape molded articles can be formed with various resins or plastics. The preferred molded article is usually formed with an engineering plastic. As the resins or plastics, there may be mentioned olefinic resins (e.g. a polypropylene), florine-containing resins, styrenic resins (e.g. an acrylonitrile-styrene copolymer, an ABS resin), acrylic resins (e.g. a poly(methylmethacrylate)), polyester resins (e.g. a homo-poly(alkylenearylate) including poly(ethylene terephtalate) PET, poly(butylene terephtalate) PBT, poly(ethylene napthalate) PEN, and a copolyester comprising an alkylenearylate unit, polyarylate resins, liquid crystal resins), polycarbonate resins, polyamide resins, polyacetal resins, polyphenylene ether resins, polyphenylene sulfide resins, polysulfone resins, and polyether sulfone resins. These resins may form a polymer blend or a polymer alloy.

These resins can be reinforced with reinforcements such as organic or inorganic fibrous reinforcements (e.g. glass fiber, carbon fiber) and particulate reinforcements.

It should be noted that the above preferred embodiments are intended to describe this invention in further detail and should by no means be interpreted as defining the scope of the invention. For instance, the web may be formed as a thin web or thicken web, and may have a uniform thickness or a thickness varied regularly (or symmetrically) or irregularly. The disk-shape resin molded articles of the present invention include, in addition to the gear, a cam such as a circular disk cam, a pulley, a worm, a pinion, a wheel or the like. Further, the gear includes for example a spur gear, a bevel gear, a helical gear, a spiral bevel gear and soon. Furthermore, the molded or shaped articles provided with an arm or a rib extending between the boss and the rim in a radius direction.

According to the present invention, even if the web is formed as a thick web, a resin molded article having an enhanced rigidity can be efficiently molded without deformation or defects of an inner peripheral surface of a boss or an outer peripheral surface of a rim. Therefore, resin molded articles having a disk or circular disk configuration can be produced by an injection-compression molding with significantly improving mechanical strength and dimensional precision.

What is claimed is:

1. An injection molding process for producing a disk-shape resin molded article that includes a rim forming peripheral area, a boss forming a concentric inner area, and a web having a disk configuration for connecting the rim and the boss, the injection molding process comprising:

injecting a molten resin into a cavity of a metal mold, the metal mold comprising a fixed mold member, a movable mold member disposed movably relative to the fixed mold member, a pressing core movably disposed or faced to at least one lateral side of the web, and a center pin disposed movably to insert into the bore of the boss and to contact with the lateral surface of the boss; and pressing, in the molding process, a web site and at least one site selected from the group consisting of a boss site and a rim site in a thickness direction, said metal mold members, said pressing core and said center pin form the closed cavity by forward movement in a thickness direction, and said cavity has a capacity larger than a volume of the final molded article by a contraction volume of the injected resin, wherein the pressing core is advanced to an original position separated from the fixed mold member with a distance corresponding to the volume of the injected molten resin, the molten resin is injected into said cavity in response to the completion of the advanced movement of the pressing core to the original position, and the pressing core is further advanced to a predetermined position which corresponds to the contraction volume or shrinking amount of the injected molten resin in response to the injection of the molten resin, and wherein in the molding process, the web site is pressed in a thickness direction, and at least one site selected from the group consisting of a lateral outer region or a lateral outer side edge of the boss and a lateral inner side edge of the rim is pressed partially in a thickness direction, wherein the whole lateral side of the boss and/or the whole lateral side of the rim is not essentially pressed.

2. An injection molding process according to claim 1, wherein said web comprises a middle circular site and an inclined area extending inwardly or outwardly from the middle circular site toward to the rim, the boss or the both with increasing thickness.

3. An injection molding process according to claim 2, wherein said middle circular site has a uniform thickness, and said inclined area is formed circumferentially with extending inwardly and outwardly from the middle circular site toward to the rim and the boss with increasing thickness.

4. An injection molding process according to claim 2, wherein the thickness of said inclined area gradually increases toward to the rim, the boss or the both.

5. An injection molding process according to claim 1, wherein the disk-shape resin molded article comprises a rim forming a peripheral circumference area, a boss forming a concentric inner area, a web having a disk configuration for connecting the rim and the boss, and outer teeth formed on the rim.

6. An injection molding process according to claim 1, wherein the molded article is a resin-molded gear.

7. An injection molding process according to claim 1, wherein the molded article is formed with an engineering plastic.

* * * * *